(12) United States Patent
Modderno et al.

(10) Patent No.: US 10,886,553 B2
(45) Date of Patent: Jan. 5, 2021

(54) LARGE SCALE FLOW BATTERY SYSTEM

(71) Applicant: Vionx Energy Corporation, Woburn, MA (US)

(72) Inventors: Jeffrey Modderno, Andover, MA (US); Michael Falcinelli, Boxford, MA (US)

(73) Assignee: Vionx Energy Corporation, Woburn, MA (US)

( * ) Notice: Subject to any disclaimer, the term of this patent is extended or adjusted under 35 U.S.C. 154(b) by 152 days.

(21) Appl. No.: 15/845,896

(22) Filed: Dec. 18, 2017

(65) Prior Publication Data

US 2018/0175438 A1 Jun. 21, 2018

Related U.S. Application Data

(60) Provisional application No. 62/436,365, filed on Dec. 19, 2016, provisional application No. 62/436,388, (Continued)

(51) Int. Cl.
*H01M 8/18* (2006.01)
*H01M 10/05* (2010.01)
(Continued)

(52) U.S. Cl.
CPC ......... *H01M 8/188* (2013.01); *H01M 2/0257* (2013.01); *H01M 2/1016* (2013.01);
(Continued)

(58) Field of Classification Search
None
See application file for complete search history.

(56) References Cited

U.S. PATENT DOCUMENTS

| 2007/0172616 A1 | 7/2007 | Ehsani et al. |
| 2011/0081562 A1 | 4/2011 | Parakulam et al. |

(Continued)

FOREIGN PATENT DOCUMENTS

| CN | 102290588 A | 12/2011 |
| CN | 105242211 A | 1/2016 |

(Continued)

OTHER PUBLICATIONS

Written Opinion of the International Searching Authority and International Search Report issued in corresponding International Application No. PCT/US17/67100, dated Mar. 7, 2018, 8 pages.
(Continued)

*Primary Examiner* — Ula C Ruddock
*Assistant Examiner* — Tony S Chuo
(74) *Attorney, Agent, or Firm* — Mintz Levin Cohn Ferris Glovsky and Popeo, P.C.

(57) ABSTRACT

Systems and methods providing modular and scalable flow batteries are disclosed. The modular design can utilize the ability of flow batteries to separate power, provided by a battery stack, from energy, provided by a stored electrolyte. Power of the system can be determined by a number of battery cell stacks, while stored energy capacity of the system can be determined by how much electrolyte is available for use by the battery cell stacks. Catholyte and anolyte solutions can be stored in pipes having an adjustable length. Electrolyte storage capacity can be increased by increasing the length of the pipes by an amount sufficient to provide a desired increase in electrolyte storage. Alternatively, electrolyte storage capacity can be decreased by decreasing the length of the pipes.

8 Claims, 15 Drawing Sheets

Related U.S. Application Data filed on Dec. 19, 2016, provisional application No. 62/436,347, filed on Dec. 19, 2016.

(51) Int. Cl.

| | | |
|---|---|---|
| *H01M 4/13* | (2010.01) | |
| *H01M 10/04* | (2006.01) | |
| *H01M 2/10* | (2006.01) | |
| *H01M 8/04082* | (2016.01) | |
| *H01M 8/2484* | (2016.01) | |
| *H01M 8/04186* | (2016.01) | |
| *H01M 8/2475* | (2016.01) | |
| *H01M 2/02* | (2006.01) | |
| *H01M 8/0221* | (2016.01) | |
| *H01M 8/04746* | (2016.01) | |

(52) U.S. Cl.
CPC ........... *H01M 4/13* (2013.01); *H01M 8/0221* (2013.01); *H01M 8/04186* (2013.01); *H01M 8/04201* (2013.01); *H01M 8/2475* (2013.01); *H01M 8/2484* (2016.02); *H01M 10/0422* (2013.01); *H01M 10/05* (2013.01); *H01M 8/04746* (2013.01); *Y02E 60/50* (2013.01)

(56) References Cited

U.S. PATENT DOCUMENTS

| | | |
|---|---|---|
| 2011/0244277 A1 | 10/2011 | Gordon, II et al. |
| 2014/0050947 A1 | 2/2014 | Donnelly |
| 2014/0227628 A1 | 8/2014 | Tang et al. |
| 2014/0255734 A1 | 9/2014 | Tennessen et al. |
| 2015/0162635 A1 | 6/2015 | Parakulam et al. |
| 2016/0006051 A1* | 1/2016 | Winter .................. H01M 8/188 429/418 |
| 2016/0204458 A1 | 7/2016 | Boersma et al. |

FOREIGN PATENT DOCUMENTS

| | | |
|---|---|---|
| JP | 2012-160344 A | 8/2012 |
| JP | 2014-127263 A | 7/2014 |
| WO | 2016/007555 A1 | 1/2016 |

OTHER PUBLICATIONS

Written Opinion of the International Searching Authority and International Search Report issued in corresponding International Application No. PCT/US17/67093, dated Mar. 7, 2018, 8 pages.

Written Opinion of the International Searching Authority and International Search Report issued in corresponding International Application No. PCT/US17/67088, dated Mar. 6, 2018, 8 pages.

* cited by examiner

LARGE SCALE FLOW BATTERY SYSTEM

CROSS-REFERENCE TO RELATED APPLICATIONS

This application claims the benefit of priority of U.S. Provisional Patent Application No. 62/436,365, filed on Dec. 19, 2016, and entitled "Large Scale Flow Battery System" and U.S. Provisional Patent Application No. 62/436,388, filed on Dec. 19, 2016, and entitled "Systems and Methods for Electrolyte Storage and Detecting Faults in Flow Batteries" and U.S. Provisional Patent Application No. 62/436,347, filed on Dec. 19, 2016, and entitled "Modular and Scalable Flow Battery System." This application is also related to U.S. patent application Ser. No. 15/846,009, filed Dec. 18, 2017, entitled "Systems and Methods For Electrolyte Storage and Detecting Faults In Flow Batteries" and U.S. patent application Ser. No. 15/845,849, filed Dec. 18, 2017, entitled "Modular and Scalable Flow Battery System". The entirety of each of these applications is incorporated by reference.

FIELD

A flow battery system is provided and, in particular, a large-scale, modular and scalable flow battery system.

BACKGROUND

Demand for large-scale energy storage solutions is increasing. For example, as more renewable energy sources (e.g., solar, wind, etc.) are added to the electrical grid, the task of balancing power supply with demand can become challenging given the intermittent, and often unpredictable, power output of renewables. This short-term intermittency can be effectively addressed by use of energy storage systems capable of large-scale energy storage in excess of demand and release of the stored energy when there is greater demand.

Flow batteries, also known as redox flow batteries or redox flow cells, can be used for large-scale energy storage. Flow batteries can be configured to convert electrical energy into chemical energy that can be stored and later released when there is demand. Flow batteries can use externally-supplied, fluid electrolyte solutions that include reactants which participate in reversible electrochemical reactions. Upon charging, the electrical energy supplied can cause a chemical reduction reaction in one electrolyte and an oxidation reaction in the other electrolyte. Upon discharge, the chemical energy contained in the liquid electrolytes can be released in the reverse reactions and electrical energy can be drawn from the electrodes. The flow batteries can be used in grid-connected energy storage systems and/or in off-grid energy storage systems.

SUMMARY

Various methods and devices are provided that include a modular flow battery system.

In an embodiment, a modular flow battery system is provided and it can include a battery stack, at least one anolyte container pipe, and at least one catholyte container pipe. The battery stack can include a plurality of cells in electrical communication and they can be configured to receive flows of an anolyte and a catholyte. The at least one anolyte container pipe can be configured to fluidly communicate with the battery stack and it can store the anolyte in a volume sufficient to permit generation of a selected amount of power. The at least one catholyte container pipe can be configured to fluidly communicate with the battery stack and it can store the catholyte in a volume sufficient to permit generation of a selected amount of power. Each of the anolyte and catholyte pipe can include at least one bend.

The modular flow battery system can have a variety of configurations. In one embodiment, at least one of the anolyte container pipe and the catholyte container pipe can be U-shaped. Terminal ends of each of the anolyte and catholyte container pipe can be in fluid communication with the battery stack.

In another embodiment, at least one of the anolyte container pipe and the catholyte container pipe can be W-shaped. Terminal ends of the anolyte and catholyte container pipes can be in fluid communication with the battery stack.

In another embodiment, at least one of the anolyte and catholyte container pipes can be oriented substantially horizontally with respect to one another.

In another embodiment, at least one of the anolyte and catholyte container pipes can be oriented substantially vertically with respect to one another.

In another embodiment, at least one pair of the anolyte and catholyte container pipes can be positioned on the same side of the battery stack.

In another embodiment, the system can also include an outer enclosure structure configured to provide secondary containment for the battery stack and the anolyte and catholyte container pipes. The enclosure structure can include a building.

In another embodiment, each at least one of the anolyte and catholyte container pipes can be configured to have an adjustable length so as to change an electrolyte storage volume therein.

Methods of assembling a flow battery system are also provided. In one embodiment, the method can include selecting a number of cells of a battery stack. The cells can be configured to receive flows of an anolyte and a catholyte. The method can also include selecting at least one anolyte container pipe. The at least one container pipe can have a first length and it can be configured to store the anolyte and to fluidly communicate with the battery stack. The method can further include selecting at least one catholyte container pipe. The at least one catholyte container pipe can have a second length and it can be configured to store the catholyte and to fluidly communicate with the battery stack. The method can additionally include coupling the at least one anolyte container pipe and the at least one catholyte container pipe to the battery stack.

In an embodiment of the method, the number of cells of the battery stack can be selected based on a desired power output of the flow battery system. At least one of the number and length of each of the anolyte container pipes and catholyte container pipes can be selected based on a desired energy storage capacity of the flow battery system.

In an embodiment, the method can further include adjusting at least one of the first and second lengths based on a desired energy storage capacity of the flow battery system.

In an embodiment of the method, the first length can be approximately equal to the second length.

In an embodiment of the method, each of the at least one anolyte container pipe and the at least one catholyte container pipe can be a U-shaped pipe.

In an embodiment of the method, each of the at least one anolyte container pipe and the at least one catholyte container pipe can be a W-shaped pipe.

In an embodiment of the method, both of the at least one anolyte container pipe and the at least one catholyte container pipe can be coupled to the battery stack on the same side of the battery stack.

In an embodiment of the method, the flow battery system can include a secondary containment including an enclosure encompassing the battery stack, the at least one anolyte container pipe, and the at least one catholyte container pipe. The enclosure can directly encompass the battery stack. The enclosure can include a building.

In an embodiment of the method, at least one container pipe of the anolyte container pipe and the catholyte container pipe can be coupled to the battery stack such that first and second terminal ends of the at least one container pipe are disposed horizontally with respect to one another.

In an embodiment of the method, at least one container pipe of the anolyte container pipe and the catholyte container pipe can be coupled to the battery stack such that first and second terminal ends of the at least one container pipe are disposed vertically with respect to one another.

In an embodiment of the method, at least one of the anolyte container pipe and the catholyte container pipe can be coupled to the battery stack such that its inlet is disposed above its outlet. The inlet can be configured to receive an electrolyte from the battery stack and the outlet can be configured to supply the electrolyte to the battery stack.

In an embodiment of the method, at least one of the anolyte container pipe and the catholyte container pipe can be coupled to the battery stack such that its inlet is disposed below its outlet. The inlet can be configured to receive an electrolyte from the battery stack and the outlet can be configured to supply the electrolyte to the battery stack.

In an embodiment of the method, at least one of the anolyte container pipe and the catholyte container pipe can be coupled to the battery stack such that its inlet is disposed at approximately the same level as its outlet. The inlet can be configured to receive an electrolyte from the battery stack and the outlet can be configured to supply the electrolyte to the battery stack.

BRIEF DESCRIPTION OF THE DRAWINGS

These and other features will be more readily understood from the following detailed description taken in conjunction with the accompanying drawings, in which.

Figure 1A:
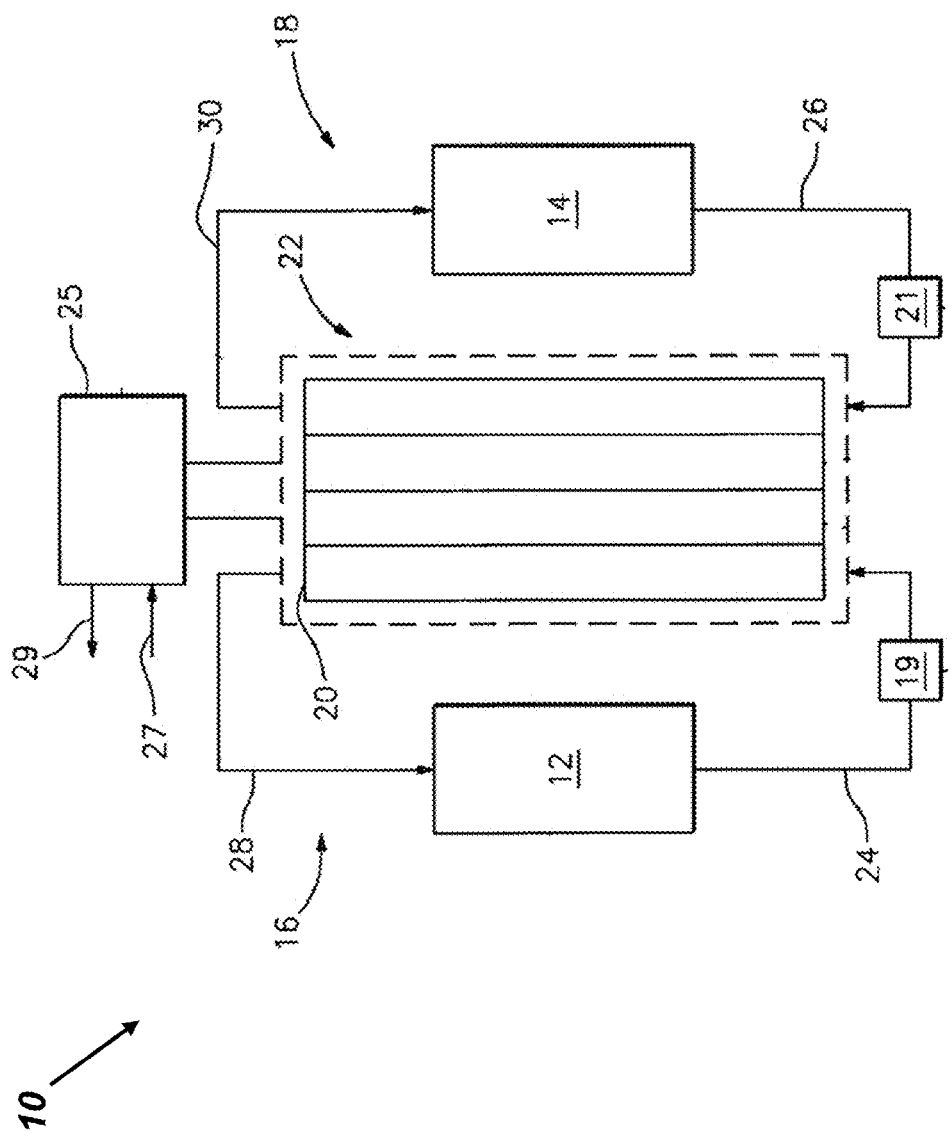
FIG. 1A is a diagram illustrating one exemplary embodiment of a flow battery system including one or more battery cell stacks.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments can generally have similar features. Thus, within a particular embodiment, each feature of each like-named component may not necessarily be fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

In general, embodiments of the disclosure provide systems and methods for energy storage. The systems can be suitable for deployment at large-scale.

A flow battery can include a redox flow cell that has a negative electrode and a positive electrode separated by a separator, such as an ion-exchange membrane. A negative fluid electrolyte, interchangeably referred to as an anolyte, can be delivered to the negative electrode. A positive fluid electrolyte, interchangeably referred to as a catholyte, can be delivered to the positive electrode. The anolyte and catholyte can be configured to drive electrochemically reversible redox reactions. The separator can be configured to prevent the electrolytes from freely and rapidly mixing but it can also be configured to permit selected ions to pass through to complete the redox reactions.

Redox Flow Batteries

FIG. 1 is a diagram illustrating one exemplary embodiment of a redox flow battery system 10. The flow battery system 10 can include a first electrolyte storage tank 12, a second electrolyte storage tank 14, a first electrolyte circuit loop 16, a second electrolyte circuit loop 18, a first flow regulator 19, a second flow regulator 21, one or more flow battery cells 20 arranged in a stack 22, a power converter 25, a controller (not shown), an energy input 27, and an energy output 29. The first and second electrolyte storage tanks 12, 14 can each be adapted to hold and store one of a pair of electrolyte solutions (e.g., a catholyte and anolyte). Non-limiting examples of suitable electrolyte solution pairs can include vanadium and vanadium solutions, bromine and polysulfide solutions, vanadium and bromide solutions, and any other solutions. The electrolyte solutions can be based on vanadium, bromine, iron, chromium, zinc, cerium, lead, sulfur or any suitable combinations thereof.

During operation of the flow battery system 10, the liquid electrolytes containing redox active species can be circulated through one or more flow battery cells 20 of the stack 22 to convert chemical energy into electrical energy for power generation. A person skilled in the art will appreciate that the redox reactions can be reversible to convert electrical energy to chemical energy for energy storage. For example, the first and second electrolyte circuit loops 16 and 18 can each include a respective source conduit 24, 26, and a return conduit 28, 30. The first and second flow regulators 19, 21 can each be adapted to selectively regulate flow of one of the electrolyte solutions through a respective one of the electrolyte circuit loops 16, 18 in response to control signals from the controller. Each flow regulator 19, 21 can include a single device, such as a variable speed pump or an electronically actuated valve, or a plurality of such devices, depending upon the particular design requirements of the flow battery system 10. Embodiments of the present disclosure, however, are not limited to any particular type of flow regulator.

Figure 1B:
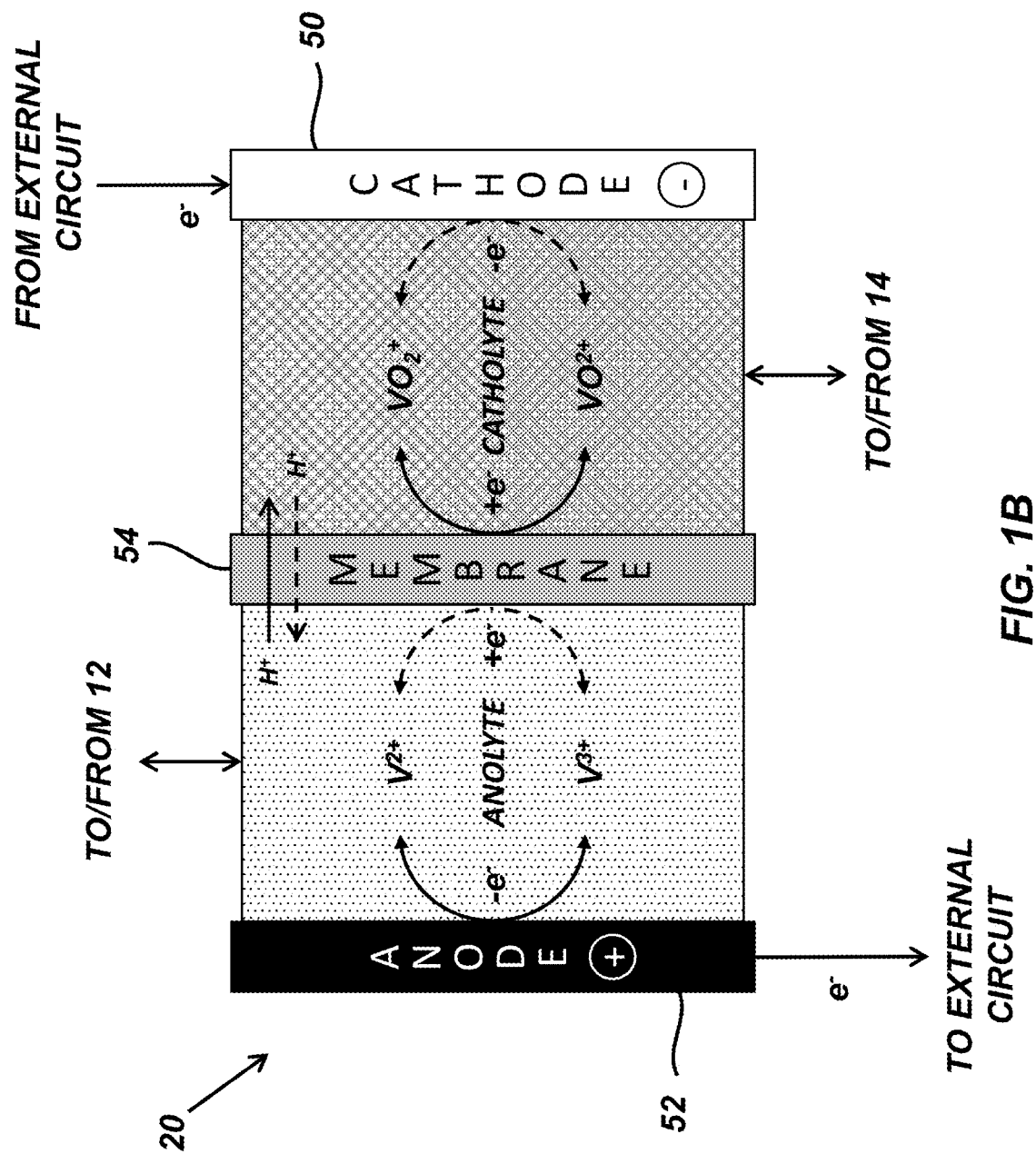
FIG. 1B is a diagram illustrating one exemplary embodiment of an electrochemical cell of the battery cell stacks of FIG. 1A.

FIG. 1B is a diagram illustrating one exemplary embodiment of a battery cell 20 of the stack 22 and representative redox reactions that can convert chemical energy of the liquid electrolytes into electrical energy. The battery cell 20 can include a porous, negative electrode (anode) 50, a porous positive electrode (cathode) 52, and a separator or membrane 54 interposed therebetween. The porous negative electrode 50 can be in fluid communication with the liquid electrolyte of the tank 12, referred to as an anolyte. The porous positive electrode 54 can be in fluid communication with the liquid electrolyte of the tank 14, referred to as a catholyte. The anode 50 and cathode 52 can also be in electrical communication with an external circuit (not shown).

In some implementations, the cell 20 can form a portion of a vanadium-vanadium (e.g., all-vanadium) redox flow battery. The liquid electrolyte for vanadium redox flow batteries can be vanadium sulfate dissolved in sulfuric acid. Concentrations of vanadium sulfate and sulfuric acid range can be selected from the range of about 1M to about 2 M and from about 4M to about 5M, respectively. Redox couples for an all-vanadium system are presented below in Equations 1 and 2. The sulfate spectator species ($SO_4$) is not shown for clarity.

Anolyte (−): $V^{+2} \leftrightarrow V^{+3} + e^-$, $U° = -0.25$ V  (1)

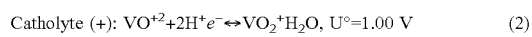

Catholyte (+): $VO^{+2} + 2H^+ e^- \leftrightarrow VO_2^+ H_2O$, $U° = 1.00$ V  (2)

Negative and positive half-cell reactions can each occur at the surface of the anode 50 and cathode 52, which can be formed from carbon-based paper and they can be separated by a separator 54 which can take the form of a perfluorinated sulfonic acid (PFSA)-based proton exchange membrane. The membrane 54 can allow protons to transfer charge between cells 20 while minimizing crossover of vanadium. In the stack 22, the cells 20 can be electrically connected in series through graphite bipolar plates (not shown) which can also contain flow channels for bulk electrolyte transport to and from each of the cells 20. The cells 20 can be fed electrolyte in parallel through a common manifold integrated into the cell stack 22.

The redox flow battery 10 can operate in three modes: charge, discharge, and electrolyte maintenance. During the charge and discharge operations, energy can be supplied or extracted from the electrolyte by pumping reactants from the storage tanks 12, 14 to the cell stack 22 in sufficient quantities to support the electrochemistry.

During electrolyte maintenance, at least a portion of effects of vanadium crossover through the separator 54 can be substantially reversed. As an example, the concentration of vanadium in the catholyte can increase over time (i.e., with an increasing number of charge/discharge cycles). Net water transport across the separator 54 can also result in changes in vanadium concentration. Both of these processes can impact an overall volume of electrolyte in each of the tanks 12, 14. Without this maintenance, energy capacity and efficiency can decrease with cycling. Vanadium precipitation can also present a concern on the catholyte side of the cells 20 if the concentration of vanadium and/or temperature exceeds predetermined thresholds (e.g., concentration greater or equal to about 2M; temperature greater than or equal to about 40° C.).

Embodiments of the systems and techniques discussed herein can employ all-vanadium redox flow batteries. However, other flow batteries can also be used. All-vanadium redox flow batteries can provide advantages over other types of redox flow batteries. As an example, other redox chemistries can exhibit incompatibility, and/or sensitivity, of the two electrolyte flows to contamination from the other. If a species crosses over and reacts irreversibly with elements in the opposite electrolyte flow, it can comprise efficiency loss on that particular charge/discharge cycle, as well as a loss of capacity and degradation in the overall performance of the system 10. As a result, expensive maintenance to separate the electrolytes and recover reactants can be required. In contrast, as all-vanadium systems employ vanadium in both the anolyte and catholyte, crossover can represent, at worst, only an efficiency loss because no species are irreversibly consumed or removed from their reactive electrolytic solution.

Flow batteries can be configured to separate power (provided by the battery stack) from energy (provided by the remotely stored electrolyte). Thus, energy storage capacity of a flow battery system can be increased by increasing the volume of the electrolytes. However, despite these benefits, the use of flow battery systems for large-scale energy storage at suitable power levels and durations still presents a number of challenges to scalability. A non-exhaustive list of certain scalability challenges is outlined below.

Large Electrolyte Storage Capacity can be Required—

For example, a 1 MW, 6 Hr system can require greater than about 100,000 gallons of electrolyte storage, while a 10 MW, 10 Hr system can require approximately 2,000,000 gallons of electrolyte storage. Accordingly, it can be beneficial for a scalable storage system to be capable of containing very high volumes of electrolytes.

Hazardous Electrolytes—

Electrolyte solutions can include corrosive acids and this can limit suitable options for electrolyte containment.

Safety—

Electrolyte storage can require secondary containment in case of accidental spill.

Uniformity—

In order to effectively utilize the electrolytes, flow batteries, it can be desirable to use all of electrolytes substantially uniformly.

Storage Cost—

Storage cost per unit area of available space can important for energy storage and/or generation to be competitive with alternatives.

Figure 2:
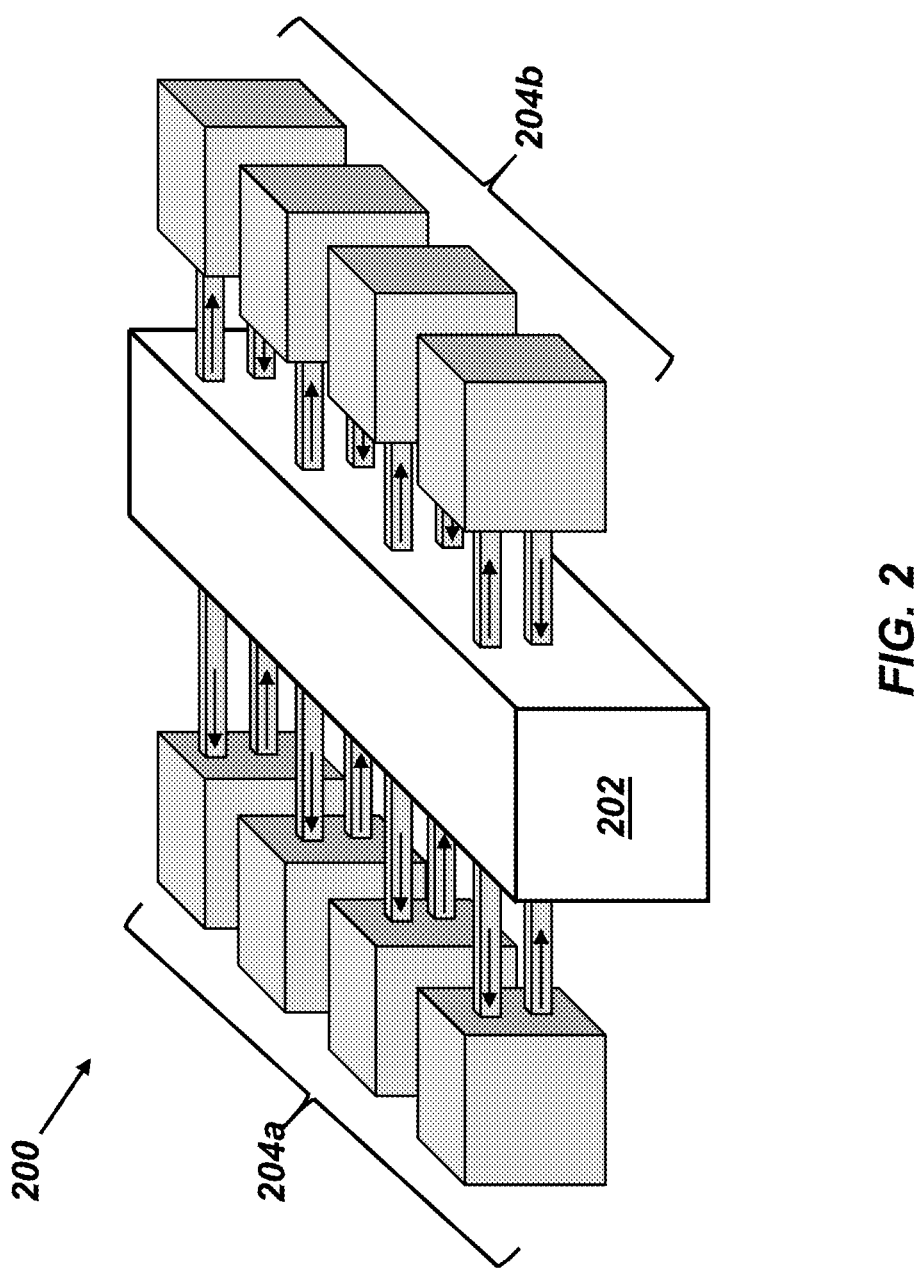
FIG. 2 is a diagram illustrating one exemplary embodiment of an operating environment including a flow battery system including a flow battery stack fluidly coupled to electrolyte storage tanks.

To address these issues, flow battery systems have been developed which can be configured to store electrolytes in large storage containers or storage tanks. One exemplary embodiment of an operating environment including a flow battery stack 202 fluidly coupled to anolyte and catholyte storage tanks 204a, 204b is illustrated in FIG. 2. The storage tanks 204a, 204b can be placed in fluid communication with the battery stack 202. As shown, the anolyte storage tanks 204a and catholyte storage tanks 204b can be placed on opposed sides of the flow battery stack 202.

In certain embodiments, the anolyte and catholyte storage tanks 204a, 204b can be generally rectangular (e.g., similar to shipping containers). Due to manufacturing and shipping considerations, the volume of the anolyte and catholyte storage tanks 204a, 204b can be less than or equal to about 20,000 gallons. So configured, sites with multiple anolyte and catholyte storage tanks 204a, 204b (e.g., sites including fifty, hundred, or more tanks) can be created.

It can be appreciated that, as the number of the anolyte and catholyte storage tanks 204a, 204b increases, the amount of plumbing and flow control infrastructure can increases significantly. Thus, system configurations can depend on available tank sizes. Furthermore, in some cases, stagnant regions of electrolytes can be undesirably formed within the anolyte and catholyte storage tanks 204a, 204b. These considerations, alone or in combination with imbalanced electrolyte usage across multiple ones of the anolyte and catholyte storage tanks 204a, 204b can decrease the electrolyte utilization and they can require excess electrolyte storage to compensate.

Accordingly, embodiments of the present disclosure can provide flow battery systems that are modular and scalable. As discussed in greater detail below, the modular design can utilize the ability of flow batteries to separate power, provided by a battery cell stack, from energy, provided by a stored electrolyte. Power can be determined by the number of battery cell stacks while energy stored can be determined by how much electrolyte is available for use by the battery cell stacks.

In the illustrated embodiments, electrolyte can be stored in pipes having an adjustable length. Use of adjustable length pipes can present advantages over tank-based storage, such as adjustable pipe length that allows selecting any desirable volume of electrolyte. For example, electrolyte storage capacity can be increased by increasing the length of pipes by an amount sufficient to provide a desired increase in electrolyte storage. In addition, in some cases, electrolyte storage capacity can be decreased by decreasing the length of pipes.

A pipe can have any suitable length and diameter. For example, a 200'×60" pipe (100' down & 100' back) can contain approximately 30,000 gallons of electrolyte. A 250'× 100" pipe can contain over 100,000 gallons of electrolyte. Each of the pipes can be configured with the supply and return conduits located at the same end of the pipe. This configuration can reduce an amount of on-site plumbing and allow for a less complicated piping system. Attendant reductions in sensors, control systems, and service components and/or systems can also be achieved. Pipes pipe with supply and return conduits located at the same end thereof can minimize or substantially eliminate imbalances between multiple tanks, which can in turn reduce stagnant regions of electrolyte and the frequency of short circuits along inlet to outlet flow paths.

In some implementations, pipes can be commercially available structures that can be transported using existing infrastructure and regulations. For example, a pipe can be a commodity product that can be available in a variety of form factors in industrial-scale quantities. This availability and form factor can facilitate acquisition and delivery of the pipes to a deployment site. Also, in some cases, pipes can be obtained from local sources, which can reduce shipping costs. Furthermore, the costs for shipping of the pipes and welding on-site can be well-defined, which can reduces the likelihood of budget shortfalls in pipe-based installations.

In embodiments of the disclosed systems and methods, secondary containment for electrolyte can also be provided by an enclosure in which the flow battery system is installed, such as a building or other structure. In this way, the battery stack can be deployed separately from the stack container. The pipes holding the electrolyte and the battery stack can thus be installed inside a building serving as secondary containment.

Accordingly, embodiments of a modular flow battery system including pipes for electrolyte storage can provide large-scale energy storage capacity that is scalable in a cost- and time-effective manner. The size of the pipes can be selected based on a desired capacity of a flow battery system and the pipes can be coupled to previously installed flow battery stacks. It should be appreciated, however, that flow battery stacks can be installed concurrently or after installation of the electrolyte storage pipes.

Figure 3A:
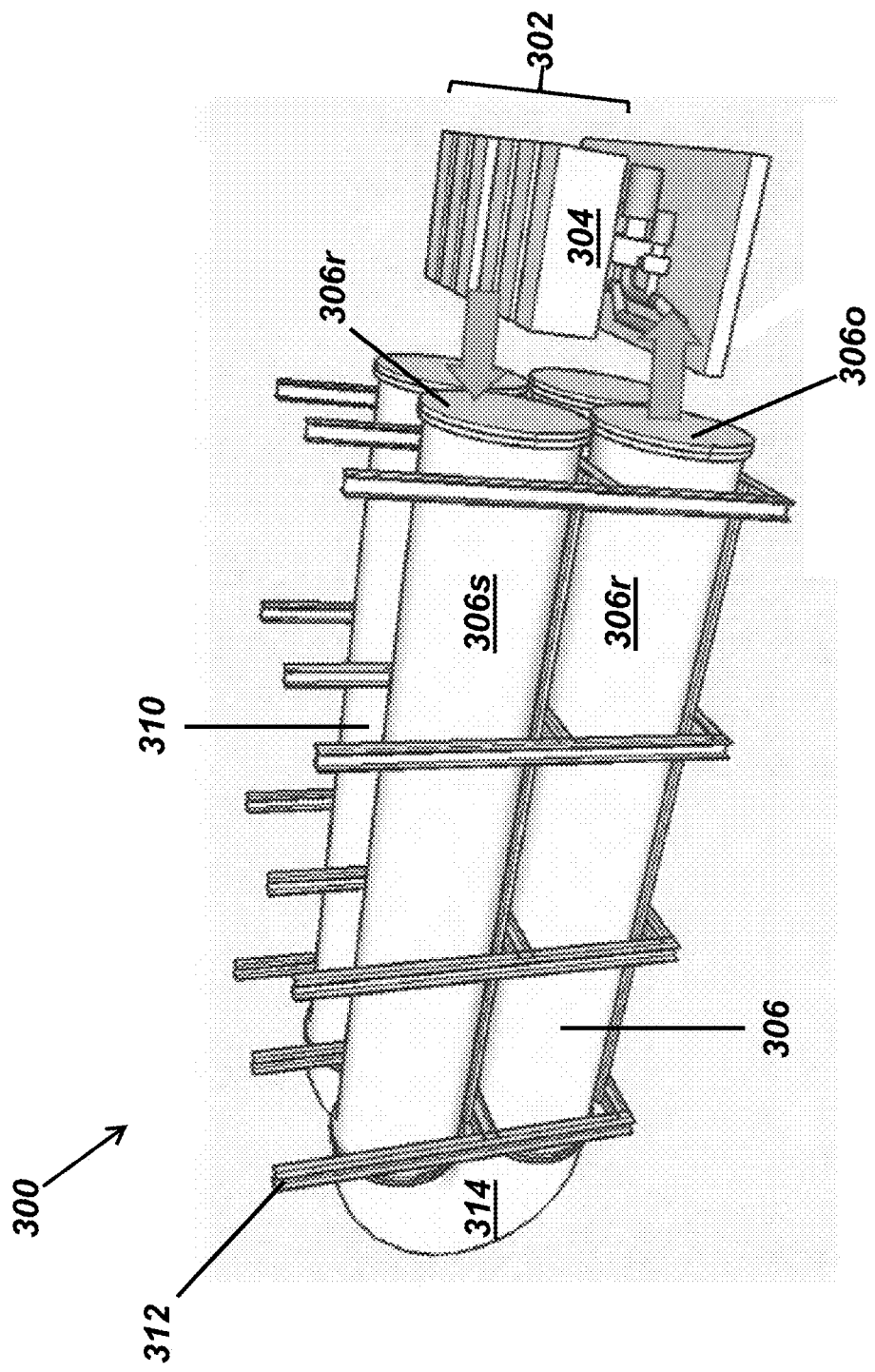
FIG. 3A is a diagram illustrating an exemplary embodiment of the modular and scalable flow battery system of FIG. 2 including scalable pipe networks for electrolyte storage.
Figure 3B:
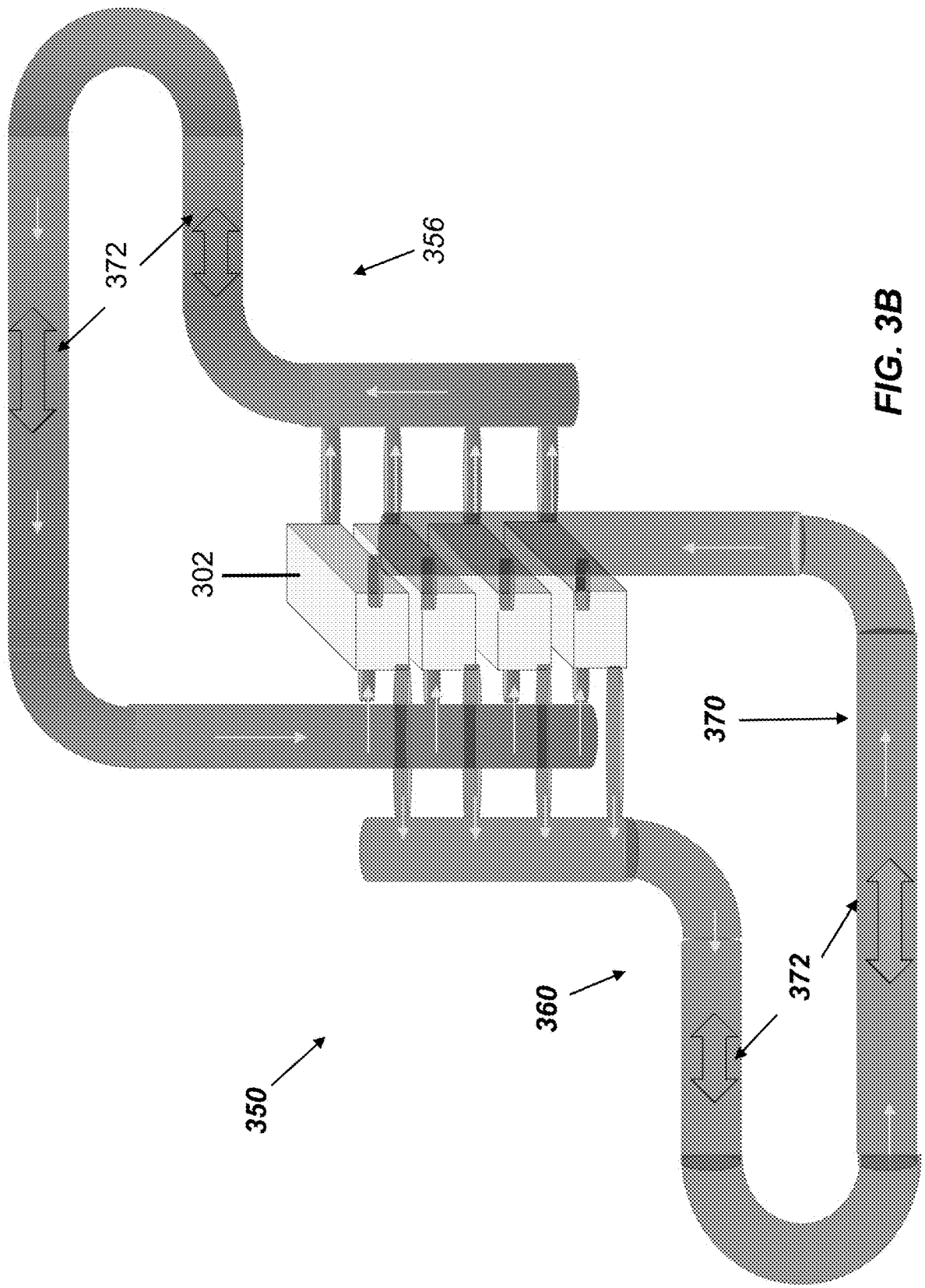
FIG. 3B is a diagram illustrating one exemplary embodiment of the scalable pipe network of FIG. 3A.
Figure 3C:
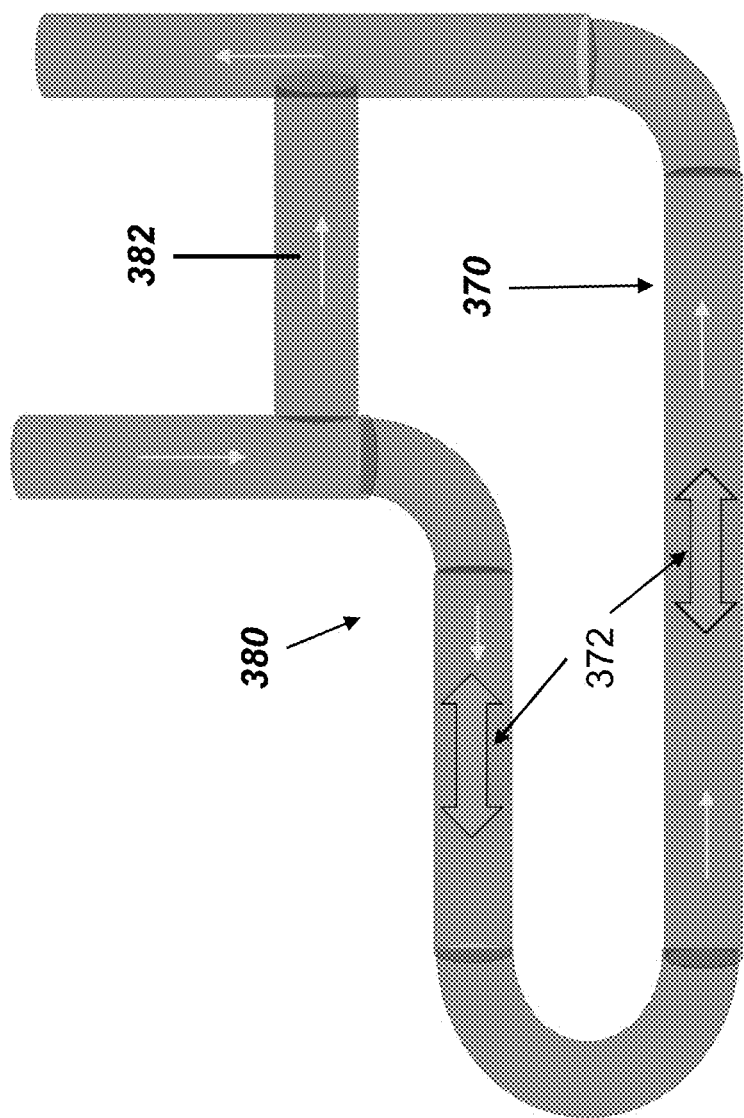
FIG. 3C is a diagram illustrating another exemplary embodiment of the scalable pipe network of FIG. 3A.

One embodiment of a modular and scalable flow battery system 300 in accordance with the described techniques is illustrated in FIGS. 3A-3C. The system 300 can include a bank of battery stacks 302, where each battery stack 302 can include a plurality of battery cells 304 configured to be placed in fluid communication with electrolyte storage pipes (e.g., pairs of anolyte storage pipes 306 and catholyte storage pipes 310). The bank of battery stacks 302 can provided with appropriate electrolyte pumps, supporting plumbing, valves, and control electronics for directing supply and return flows of respective electrolytes to battery stack cells 304, which are omitted from FIGS. 3A-3C for clarity. The plumbing can be configured to allow a variable number of pairs of anolyte storage pipes 306 and catholyte storage pipes 310 to be coupled to the plurality of battery stacks 302.

The described systems and methods can be configured for operation in an all-vanadium redox flow battery. However, it should be appreciated that such redox flow batteries can include other electrochemically active species, as the described techniques are not limited to any particular type of redox flow batteries.

The pipes 306, 310 can be held in place (e.g., by respective racks 312) and an electrolyte can be supplied to the battery stacks 302 from an outlet or supply at one end of each pipe and returned from the battery stacks 302 at an inlet or return at the other end of the pipe. As an example, the anolyte storage pipe 306 can include a supply section 306s having an inlet 306i and a return section 306r having an outlet 306o. The catholyte storage pipe 310 can be similarly configured. The anolyte and catholyte storage pipes 306, 310 can have any configuration suitable for supply and return of the electrolytes.

In the example of FIG. 3A, each of the anolyte and catholyte storage pipes 306, 310 are U-shaped and include a bend 314 formed at an end opposite the outlet and inlet (e.g., 306o, 306i) and the supply and return sections (e.g., 306s, 306r) can be positioned vertically with respect on one another. As an example, the supply outlet 306o can be positioned on the bottom and the return inlet 306i can be on the top). However, the shape, orientation and direction of electrolyte flow within each pipe, as well as the number of pairs of pipes can be varied.

In some embodiments, the shape of the electrolyte storage pipes 306, 310 can be different to accommodate specific sites. For example, rather than a single U-shaped pipe (down and back), the anolyte and catholyte storage pipes can be W-shapes (down, back, down, and back) for a shorter, but wider site. In another example, the pipes 306, 310 can be arranged horizontally or at a selected angle with respect to the ground. In further embodiments, the diameter of the electrolyte storage pipes 306, 310 can be varied along their length. For example, the supply and return sections of the pipe (e.g., 306s, 306r) can have different diameters (e.g., a 100" return and an 80" supply). In such a configuration, an 80" pipe can be shipped inside the 100" pipe to optimize shipping costs. In additional embodiments, a diameter of the anolyte and catholyte pipes 306, 310 can be selected independently from one another and they can be approximately the same or different with respect to one another. For example, one of the anolyte and catholyte pipes 306, 310 can be bigger than the other, allowing shipment of the pipes with the smaller inside the larger.

FIG. 3B illustrates another embodiment of a flow battery system 350, only a portion of which is shown. As shown, the flow battery system 350 can include catholyte storage pipes 356 and anolyte storage pipes 360. For example, each of the anolyte and catholyte storage pipes 356, 360 can include a scalable pipe section 370 including variable length pipes 372 between their terminal ends. For example, the variable length pipes 372 can be provided within an approximately straight section of the storage pipes 356, 360 and they can be lengthened or shortened to adjust the capacity of each of the storage pipes 356, 360.

In alternative embodiments, the storage pipes can include a bypass. For example, FIG. 3C illustrates another embodiment of a catholyte storage pipe 380 with a bypass 382. The bypass 382 can be positioned at a location within the catholyte storage pipe 380 outside the scalable pipe section 370. The anolyte storage pipe (not shown) can similarly include a bypass. In this manner, electrolyte flow can be diverted through the bypass 382 and drained from the scalable pipe section 370. Subsequently, the length of the scalable pipe section 370 can be varied without shutting down the entire system. Embodiments of electrolyte storage pipes with a bypass can be employed in either of the systems 300, 350.

Figure 4:
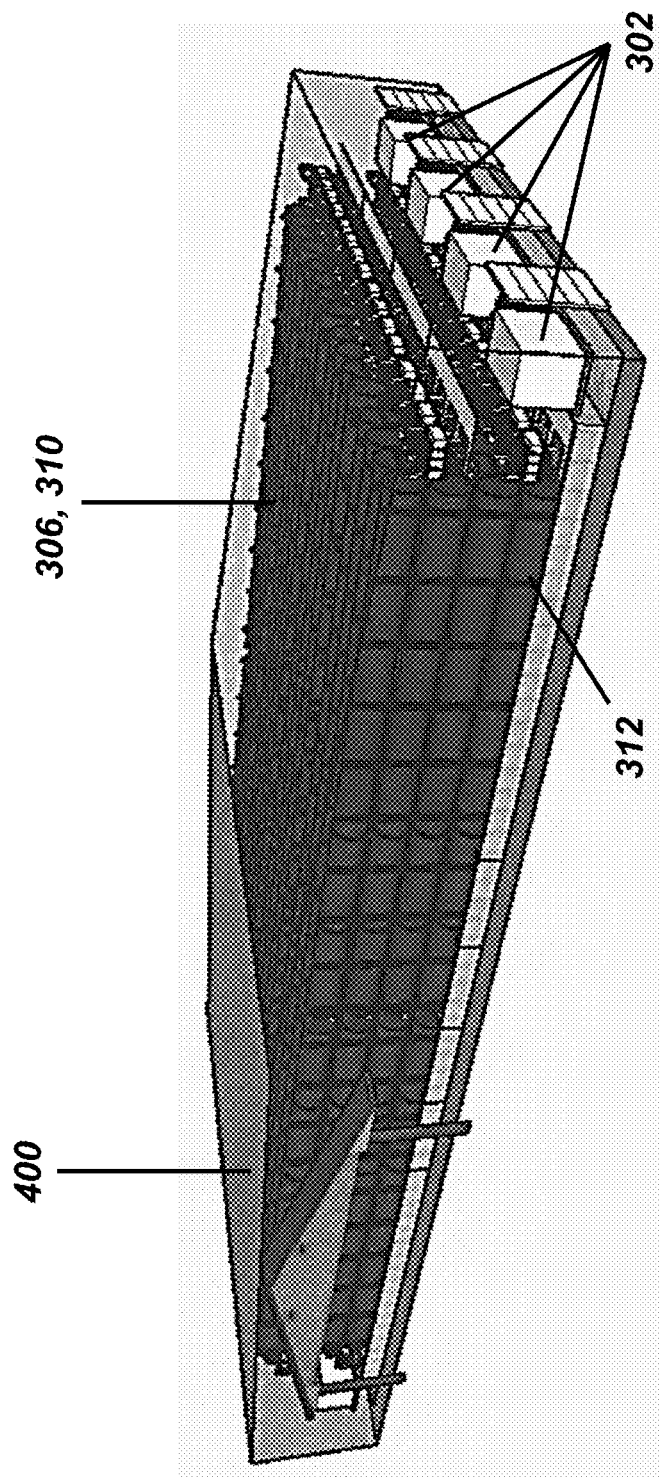
FIG. 4 is a cutaway view of a building housing an embodiment of the modular and scalable flow battery system of FIGS. 3A-3C.

Secondary containment for electrolytes can be provided by an enclosure 400, such as a building or other structure, in which the flow battery system (e.g., 300, 350) is installed, as illustrated in FIG. 4.

Figure 5A:
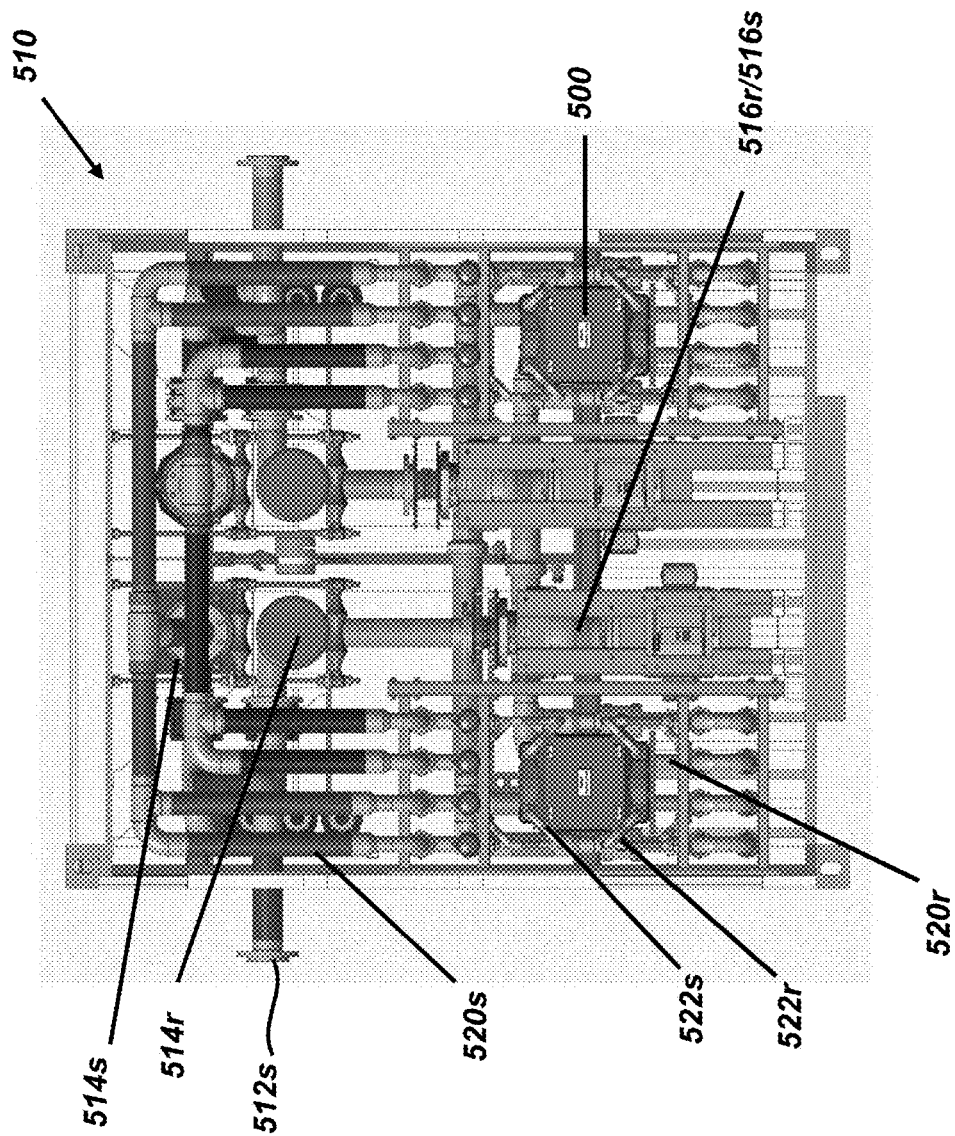
FIG. 5A is a diagram illustrating an end view of flow battery cell stacks and a fluid conduit network contained within a battery stack of the modular and scalable flow battery system of FIGS. 3A-3C.
Figure 5B:
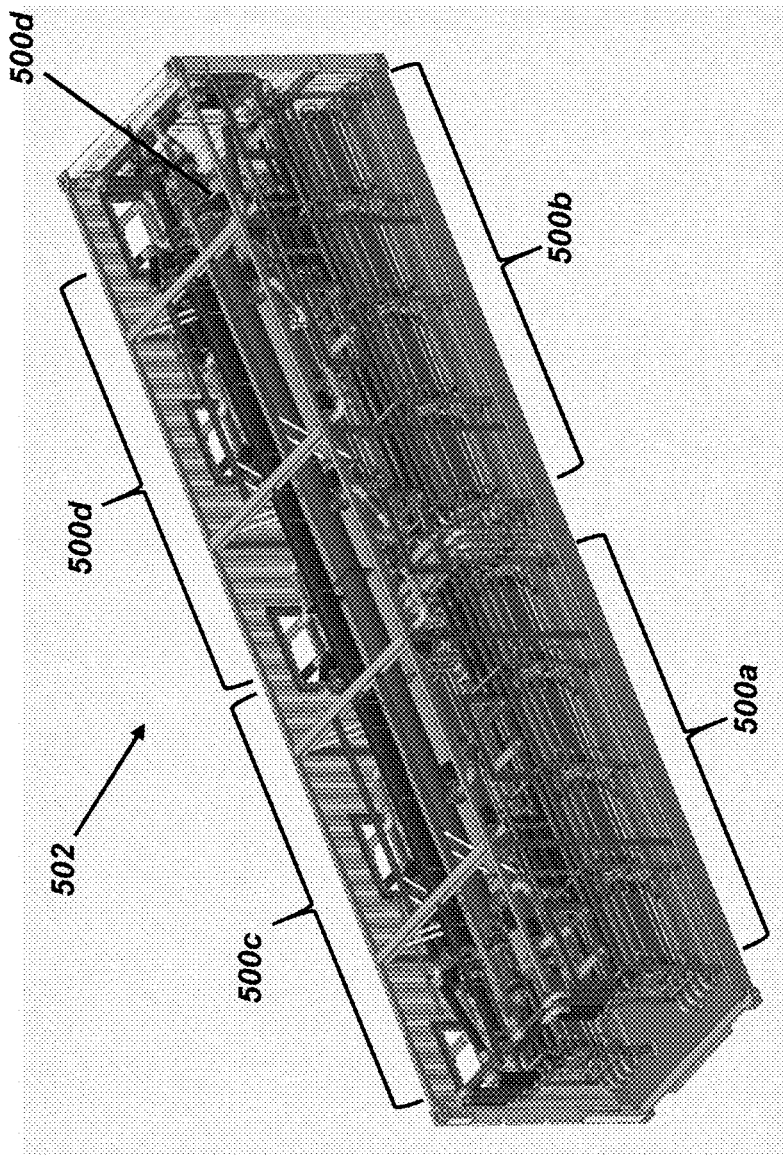
FIG. 5B is a diagram illustrating an isometric, cutaway view of the flow battery cell stacks and the fluid conduit network of FIG. 5A.
Figure 5C:
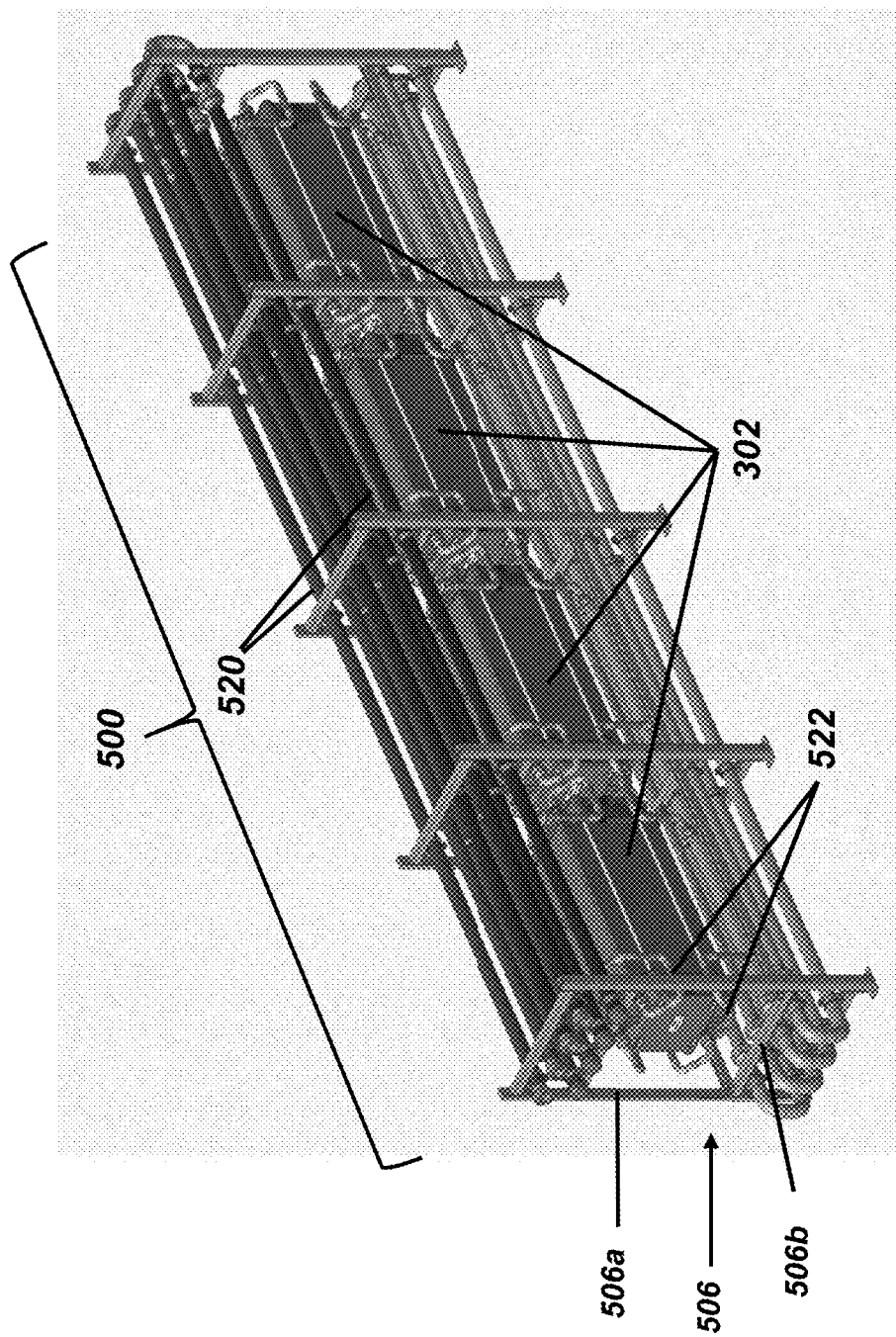
FIG. 5C is a diagram illustrating a portion of FIG. 5B.

An embodiment of battery stack banks and associated fluid conduit network are illustrated in FIGS. 5A-5C. A given battery stack 302 can be wired in a selected electrical configuration with respect to one or more other battery stacks 302 to form battery stack banks 500. The battery stack banks 500 can in turn be wired in a selected electrical configuration with respect to one another to provide a battery stack assembly 502 that can be configured to achieve desired voltage and current levels. In certain embodiments, a battery stack 302 can include battery cells and/or stacks implemented in accordance one of the following: U.S. Pat. No. 9,774,044 ("Flow Battery Stack With An Integrated Heat Exchanger", filed on Sep. 21, 2011); US Patent Publication No. 2013/0029196 ("Flow Battery Cells Arranged Between An Inlet Manifold And An Outlet Manifold," filed on Jul. 29, 2011); U.S. Pat. No. 9,166,243 ("Flow Battery With Interdigitated Flow Field," filed on Dec. 18, 2009); US Patent Publication No. 2015/0263358 ("Flow Battery With Mixed Flow," filed Dec. 20, 2011); and U.S. Pat. No. 8,884,578 ("Method And System For Operating A Flow Battery System Based On Energy Costs," filed on Feb. 7, 2011), the entire content of each is hereby incorporated by reference herein. For example, in the embodiment illustrated in FIGS. 5B-5C, battery stack banks, 500a, 500b, 500c, 500d can be provided. Each of the battery stack banks 500a, 500b, 500c, 500d can be an electrically parallel element (e.g., 1S4P configuration). The two sets of battery stack banks 500a, 500b can be electrically wired in series (e.g., an overall 2S4P configuration) and the same can be done for the battery stack banks 500c, 500d. Each of these configurations can be further wired in parallel (e.g., an overall 2S8P configuration of 16 stacks) to form a battery stack assembly 502.

For example, assuming 125 cells per battery stack 500, this configuration can provide eight parallel strings of 250 cells in series to provide the rated power of the battery stack assembly 502. Further assuming use of vanadium flow cells having a nominal potential of about 1.4V, each of the battery stacks 302 can have a nominal potential of about 175V and each battery stack assembly 502 can have a nominal potential of about 350V.

In further embodiments, the battery stacks 302 can be split into multiple sections. Continuing the example above in which each battery stack 302 includes 125 battery cells 304 electrically wired in series, a battery stack 302 can be split into two electrolyte sections (e.g., in approximately half, where one electrolyte section includes 62 cells and the remaining battery electrolyte section includes 63 cells). Beneficially, such an arrangement can provide improved mitigation of shunt currents through external piping.

Each battery stack 302 can include a close mounted contactor which can be capable of conservatively handling full system voltage and maximum stack current. This configuration can allow for staggered connection as well as electrical isolation of any battery stack 302. The most positive side of the battery stacks 302 on each side of the battery stack assembly 502 can be individually fused, yielding eight fuses. The fuses can be designed to protect the wiring of the battery stack assembly 502 in the event of a catastrophic short, and not merely an overload condition, as the maximum rated current falls well within its rating. For example, assuming that the fuses are rated at about 400 amps each, the battery stack assembly 502 can be protected at about 3200 amps total.

Each of the battery stack banks 500 can be bused together with copper bus bars and interconnected to other sets using copper cabling. All bus bars and cables can be rated for the full value of the protective fusing in order to meet the NEC wiring requirements and minimize wiring losses. A precision current shunt can be further provided to measure current in or out of the battery stack assembly 502 as well as voltage measurement for each battery stack bank 500. These values can be reported to a battery stack controller, discussed below.

Battery stacks 302 can be mounted within a rack 506. In certain embodiments, the battery stacks can be further positioned inside a battery stack container 508. As shown in FIG. 5C, the rack 506 includes vertical supports 506a and horizontal supports 506b. In an embodiment, the vertical supports 506a can be formed in a 3 in. c-channel configuration. One side of the rack 506 (e.g., a rear side) can be positioned against the battery stack container 302 and another, opposite side of the rack 506 (e.g., a front side) can face the middle of the battery stack container 302. In alternative embodiments, placed outside, rather than inside a battery stack container, open to the environment of the enclosure 400.

Each battery stack 302 can be connected to a fluid conduit network 510 to allow flow of the anolyte and catholyte therethrough. The fluid conduit network 510 can include respective main electrolyte manifolds 514, electrolyte pumps 516, shunt manifolds 520, and battery stack manifolds 522 for supply and return of each of the anolyte and catholyte. For example, with respect to the supply, each electrolyte can enter the battery stack container 302 through a one or more respective supply pipe s512s, each of which can be coupled to a respective supply main electrolyte manifold 514s. Each supply main electrolyte manifold 514s can be large enough such that flow into and out of it is approximately balanced (e.g., about 10 in. pipes). The flow of electrolyte supply within the supply main electrolyte manifold 514s can be directed to a supply electrolyte pump 516s (e.g., at an approximately 200-400 gpm flow rate), and fed to the battery stacks 302 through respective ones of supply shunt manifolds 520s (e.g., 2 in. pipes) and supply battery stack manifolds 522s. The return electrolyte flows proceed in the reverse, through separate return portions of the fluid conduit network 510 for each electrolyte, from the battery stacks 302, through return battery stack manifolds 522r, return shunt manifolds 520r, return pumps 516r, and return main electrolyte manifold 514r. From the return main electrolyte manifold 514r, the electrolyte can exit the battery stack container 510 via respective return pipes 512r.

The shunt manifolds 520 can include lengths of piping designed to mitigate excessive shunt current losses between cells in the battery stacks 302. The battery stack container 502 can include shunt manifolds 520 configured to reduce losses associated with the shunt currents to an acceptable level. Each of the shunt manifolds 520 can serve to contain one of an anolyte supply to an associated battery stack 302, a catholyte supply to an associated battery stack 302, an anolyte return from an associated battery stack 302, and a catholyte return from an associated battery stack 302. In certain embodiments, the shunt manifolds 520 can be approximately 2 in. diameter pipes and provide approximately 19 ft. of shunt distance. In further embodiments, one or more of the vertical supports 506a of the rack 506 can be removable (e.g., those on a front side facing towards the middle of the battery stack container 502) to allow installation of the shunt manifolds 520.

In an embodiment, the pumps 516 can be driven by variable frequency drives (VFDs). This configuration can allow for independent, precise speed and consequently flow and pressure control of anolyte and catholyte, as well as smooth startup and detailed feedback on motor power parameters can also be provided. These VFDs can be powered by an auxiliary power panel controlled by a battery stack controller, discussed in detail below.

Figure 6:
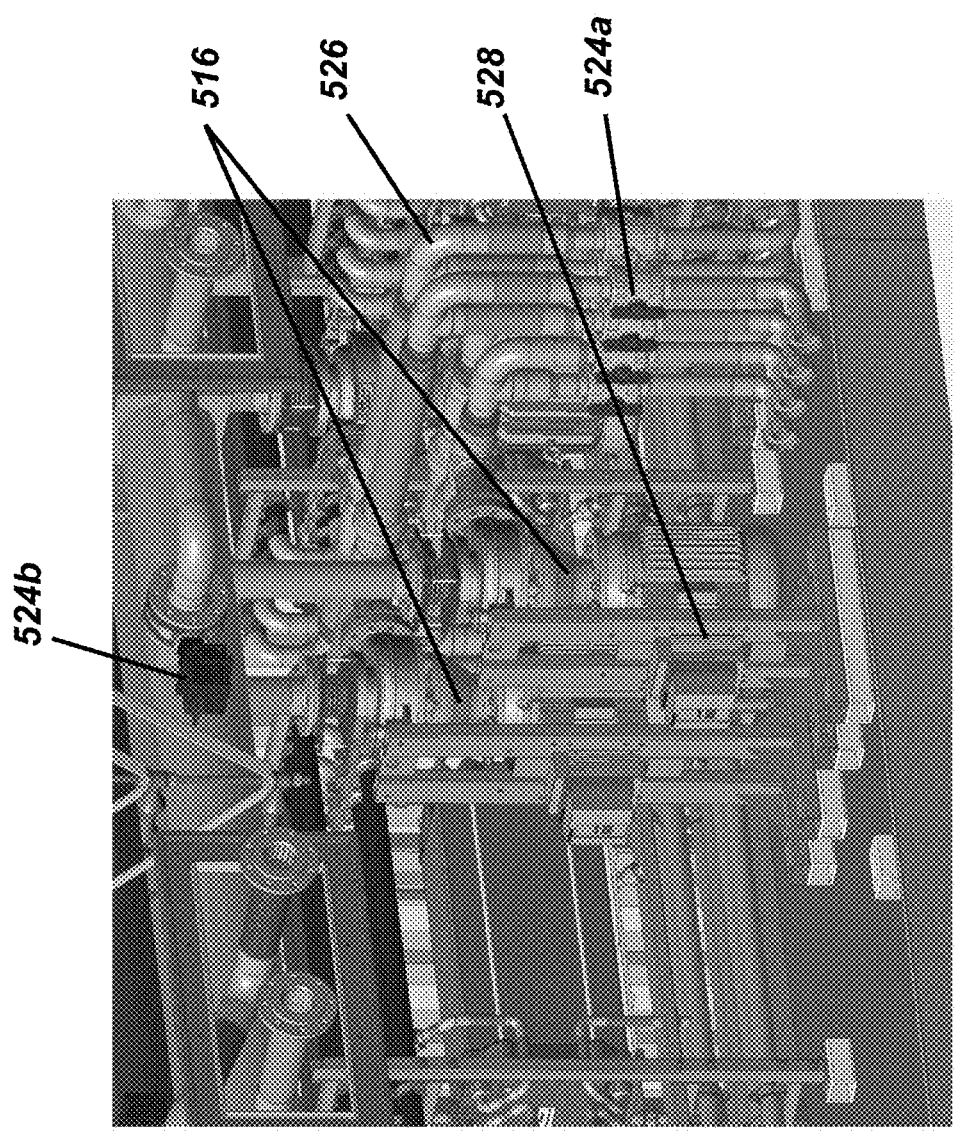
FIG. 6 is a diagram illustrating an isometric view of one exemplary embodiment of pumps within another portion of the flow battery stacks of FIGS. 5A-5C.
Figure 7A:
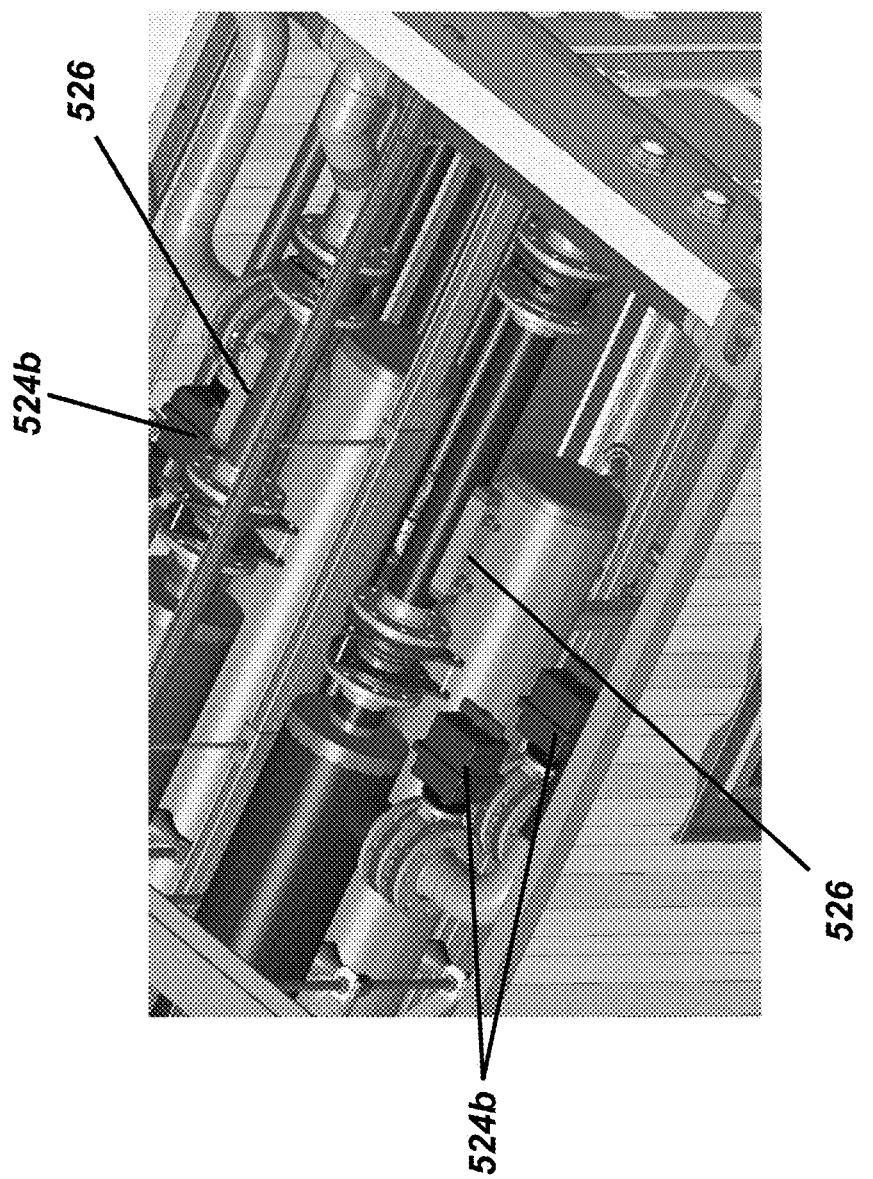
FIG. 7A is a diagram illustrating an isometric view of one exemplary embodiment of valves and sensors in communication with a portion of the fluid conduit network of FIGS. 5A-5C.
Figure 7B:
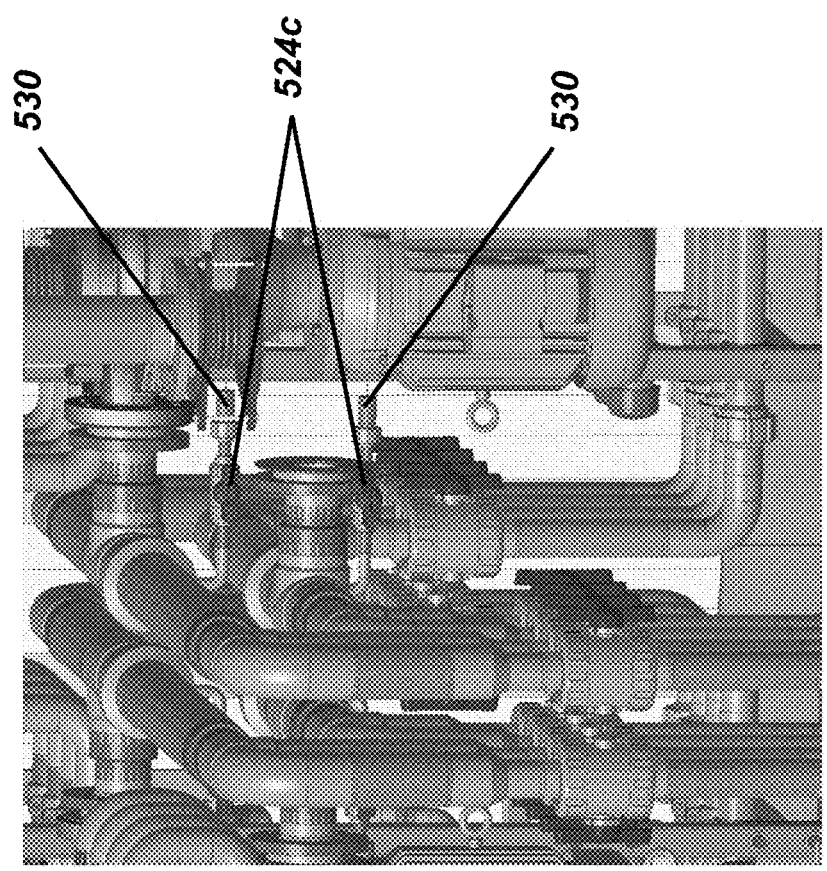
FIG. 7B is a diagram illustrating an isometric view of one exemplary embodiment of valves and sensors in communication with another portion of the fluid conduit network of FIGS. 5A-5C.

Embodiments of the fluid conduit network 510 can further include one or more valves (e.g., balancing valves, shutoff valves, etc.). In general, the valves can be employed to control flow for rebalancing levels, to shut off main feeds when the battery stack container 502 is off, and to isolate specific battery stacks 302. The valves can include manual valves for service functions and automated valves for configurations in which shutdown, startup, and various system functions are to be operated under the control of a battery stack controller, discussed in greater detail below. For example, as illustrated in FIG. 6, valves 524a can be optionally provided in cross-tie manifolds 526 that distribute electrolytes between respective pumps 516 and shunt manifolds 520 for shut-off or balancing. Shutoff valves 524b can be further provided between the supply/return connections and the main electrolyte manifolds 514 (FIGS. 6, 7A). Valves 524c can be provided between shunt manifolds 520 and battery stacks 302 (FIG. 7B). Automated actuation of the valves 524 can be provided by motors 528 in communication with the battery stack controller.

When automated valves are used, feedback can be provided to this control system to ensure proper operation. Embodiments of the fluid conduit network 510 can include one or more sensors (e.g., temperature sensors, flow sensors, pressure sensors, optical sensors, etc.) for monitoring and/or feedback control of the valves 524a, 524b, 524c to regulate flow of the anolyte and catholyte therethrough during operation. Examples of anolyte and catholyte flow sensors 526 and anolyte and catholyte pressure sensors 530 are illustrated in FIGS. 7A, 7B.

Figure 8:
FIG. 8 is a diagram illustrating a cutaway view of a main electrolyte manifold support system configured for use with the fluid conduit network of FIGS. 5A-5C.

A support structure 800 for the main electrolyte manifolds 514 is illustrated in FIG. 8. A support beam 802 (e.g., a 5×16 beam) can span a width of a structure containing the battery stack container 502. Support rods 804 (e.g., ⅞ in. diameter) can be hung in pairs from the support beam 802. Roller pipe supports 806 can be secured to each pair of support rods 804. In certain embodiments, a roller pipe support 806 can be provided for each main electrolyte manifold 814. Seismic cross-braces 810 may be further secured to the support rods 804 for stabilization in the event of a seismic event.

The electrolyte can have a specific operating temperature range, typically between about 15° C. to about 40° C. If a temperature of the electrolyte falls below about 15° C., the system can be unable to provide full power operation until the electrolyte reaches that temperature. If the electrolyte temperature falls below about −15° C., there is a danger the electrolyte could freeze and, as a result, the system 300 may be unable to provide full power operation. Therefore, if the system 300 is in a cold environment, the ability to supply external heat to the electrolyte can be beneficial.

Alternatively, on hot days, this problem can be reversed. System losses can drive the electrolyte temperature over 50° C., above the upper limit of the electrolyte operating temperature range. This condition can be problematic because, when the electrolyte is at a high state of charge and a high temperature, precipitation of one or more components of the electrolyte can occur, which can result in shut down of the system 300 due to clogging. While this phenomenon is reversible, it can adversely affect availability. Thus, heating or cooling of the electrolyte can be desirable under different operating conditions.

Figure 9:
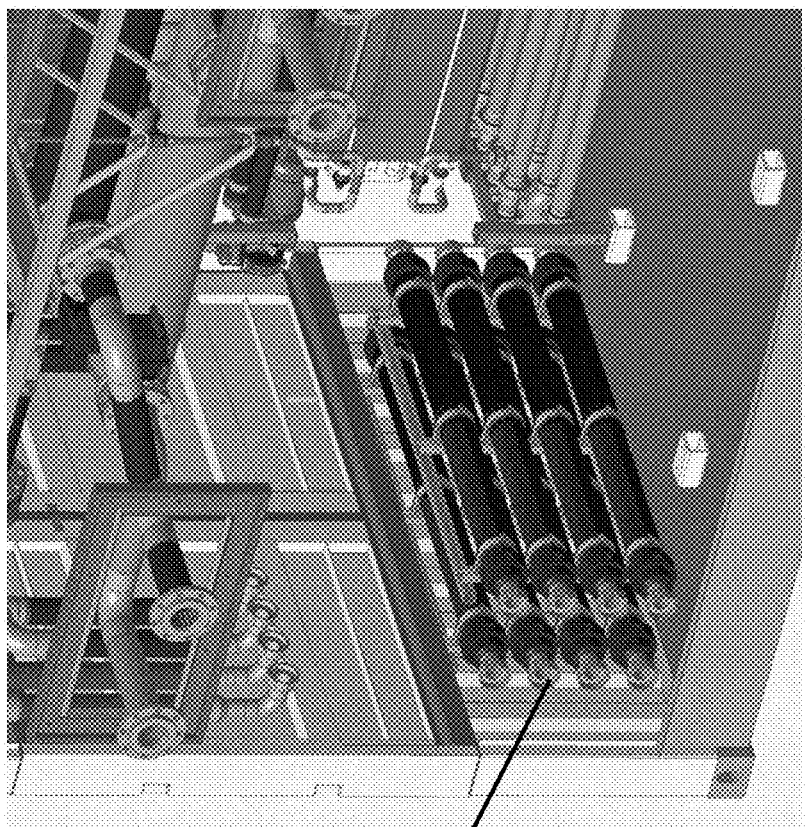
FIG. 9 is a diagram illustrating an isometric view of a heat exchanger assembly configured for use with the battery stacks of FIGS. 5A-5C.

To heat and cool the electrolyte, embodiments of the battery stack container 302 can include one or more heat exchangers 900 (e.g., liquid-to-liquid heat exchangers). The heat exchangers 900 can be configured for thermal communication with the electrolyte, as illustrated in FIG. 9. Instrumentation and control logic for regulating flow and demand for heated or cooled water-glycol mix from an external site chiller-heater system can be further provided. Requests from individual battery stacks 302 can be aggregated and commands responsive to these requests can be the chiller-heater system as required. In certain embodiments, eight heat exchangers can be configured in a parallel configuration to achieve higher capacity.

Additional systems that can be employed for operating embodiments of the battery stacks 302 and the fluid conduit network 510 are discussed below.

Auxiliary Power

AC Auxiliary power can be connected to the battery stacks 302 via an AC Auxiliary Power panel (not shown). This panel can feature a main, lockable, disconnect switch and is built in accordance with industry standards (e.g., UL 508 standards). Individual circuit breakers can be provided to protect feeds to each of the two pump VFDs, fans, control panel power supply, lighting, and other local AC loads. This panel can also include line reactors (if necessary). All wiring and components except for VFDs and conduit wiring can be contained in this panel, improving servicing safety issues, as most of the AC electrical hazard is confined to this enclosure. This panel can be interlocked to prevent operation under selected circumstances (e.g., when a structure enclosing the battery stacks 302 and the fluid conduit network 510 is open. This panel can also supply an optional personnel environment heater.

Battery Stack Controller

In an embodiment, each battery stack 302 can further include a battery stack controller. The battery stack controller can include a computing device capable of executing data acquisition and control programs configured to monitoring all sensors and instrumentation in the battery stack as well as controlling valves and motor drives. This controller can be configured to communicate with a main Battery System Controller (BSC) located externally. Battery backup can be provided to allow the BCC to operate substantially immediately following a system power outage. This can allow the BSC to set valves to a save condition and to communicate the power fail state to the outside world along with other current conditions. Sensor inputs can be provided with self-test and internal calibration capability. Isolation can be provided where necessary and inputs can be protected from overcurrent and radio frequency interference (RFI). The BSC can connectors for external sensors and other connections to minimize mean time to repair (MTTR) should it fail.

The battery stacks 302, the fluid conduit network 510, and areas adjacent thereto can further include an independent safety system. This system can employ safety rated components such as leak sensors, interlock switches and control relays to shut down the system in the event of hazardous conditions (such as a significant leak), access interlock conditions, or certain faults. This system can be configured to operate completely independent of any software or remote over-ride command.

One skilled in the art will appreciate further features and advantages of the disclosed systems and methods based on the above-described embodiments. Accordingly, the present disclosure is not to be limited by what has been particularly shown and described, except as indicated by the appended claims. All publications and references cited herein are expressly incorporated herein by reference in their entirety.

The invention claimed is:

1. A modular flow battery system, comprising:
a battery stack including a plurality of cells in electrical communication and configured to receive flows of an anolyte and a catholyte;
at least one anolyte container pipe configured to fluidly communicate with the battery stack and to store the anolyte in a volume sufficient to permit generation of a selected amount of power; and
at least one catholyte container pipe configured to fluidly communicate with the battery stack and to store the catholyte in a volume sufficient to permit generation of the selected amount of power;
wherein each of the anolyte and catholyte container pipes includes at least one bend; and
wherein at least one of the anolyte and catholyte container pipes includes a scalable pipe section configured to lengthen or shorten so as to change an electrolyte storage volume therein.

2. The flow battery system of claim 1, wherein at least one of the anolyte container pipe and the catholyte container pipe is formed in a U-shape or a W-shape and wherein terminal ends of the anolyte and catholyte container pipes are in fluid communication with the battery stack.

3. The flow battery system of claim 1, wherein at least one of the anolyte and catholyte container pipes is oriented substantially horizontally with respect to one another.

4. The flow battery system of claim 1, wherein at least one of the anolyte and catholyte container pipes is oriented substantially vertically with respect to one another.

5. The flow battery system of claim 1, wherein at least one pair of the anolyte and catholyte container pipes are positioned on the same side of the battery stack.

6. The flow battery system of claim 1, further comprising an outer enclosure structure configured to provide secondary containment for the battery stack and the anolyte and catholyte container pipes.

7. The flow battery system of claim 6, wherein the outer enclosure structure comprises a building.

8. The system of claim 1, wherein at least one of the anolyte and catholyte container pipes further comprises a bypass extending between pipe portions outside of the scalable pipe section.

* * * * *